United States Patent Office 3,493,429

Patented Feb. 3, 1970

3,493,429

FLAME SPRAYING PROCESS

Adi J. Mountvala, Chicago, Ill., assignor, by mesne assignments, to Motorola, Inc., Franklin Park, Ill., a corporation of Illinois No Drawing. Filed Dec. 6, 1966, Ser. No. 599,373
Int. Cl. B44d *1/18, 1/44;* B44c *1/02*
U.S. Cl. 117—215 3 Claims

ABSTRACT OF THE DISCLOSURE

A process for flame spraying piezoelectric material on a metal substrate which utilizes an oxide coating on the substrate to increase the bond between the materials, and a post-heating treatment of the combined materials to increase the coupling coefficient therebetween.

BACKGROUND OF THE INVENTION

Flame spraying, which can be defined as the deposition of minute particles of a material to form a coating on a substrate by passing the particles through a continuous flame generating device such as an oxyacetylene torch, is well known. It is also known to use a flame spray process to deposit piezoelectric materials on metal substrates. However, in many instances, piezoelectric materials deposited in this manner form a poor bond with the substrate, and the combined materials exhibit a low coefficient of coupling.

SUMMARY OF THE INVENTION

It is an object of this invention to provide an improved process for flame spraying piezoelectric material on a metal substrate.

It is another object of this invention to provide a process for flame spraying piezoelectric material on a metal substrate that improves the coupling coefficient between the materials.

It is a further object of this invention to provide a process for flame spraying a piezoelectric material on a metal substrate that improves the bond between the two materials.

A feature of this invention is a process for flame spraying a piezoelectric material on a metal substrate, which includes the step of post-heating the combined metal substrate and piezoelectric layer to increase the coefficient of coupling.

Another feature of this invention is the step of oxidizing the metal substrate prior to flame spraying the piezoelectric material to provide a rough surface to form a good molecular and mechanical bond, and to relieve shearing forces produced by the metal and ceramic cooling at different thermal rates.

In practicing one embodiment of this invention, a metal substrate is preheated until the surface on which the piezoelectric material is to be flame sprayed is oxidized. By oxidizing the surface, it becomes rougher and forms a good molecular and mechanical bond with the ceramic. Furthermore, the oxide layer absorbs shearing stresses that are produced by the metal and ceramic cooling at different thermal rates. The combined piezoelectric layer and the metal substrate is then post-heated to increase the coefficient of coupling therebetween.

DETAILED DESCRIPTION OF THE PREFERRED EMBODIMENT

In one specific example, barium titanate powder (a piezoelectric material) having a particle size ranging from −44 to +5 microns was passed through an oxyhydrogen flame onto an "Elinvar" substrate in the form of a metal disc one inch in diameter and .010 inch thick. Elinvar is a nickel-iron alloy metal, and is the trademark of The Hamilton Watch Company. The flame spray gun was held at a distance of 2½ inches from the disc, and a gas ratio of 55 cubic feet per hour of oxygen and 100 cubic feet per hour of hydrogen was used. The powder was deposited at the rate of 23 grams per minute. The temperature of the substrate was monitored by a thermocouple in contact with the back surface of the disc.

The disc was preheated with the flame spray gun to a temperature of 1300° F., and the surface of the disc was oxidized to a thickness of not less than .05 mils and not greater than 1.0 mils. The piezoelectric material was then flame sprayed onto the hot substrate. Subsequent to depositing the material on the substrate, the combined piezoelectric material and metal disc were post-heated by the torch with the powder feed turned off at a temperature of 1300° F. for 5 minutes.

Because of the difference in the thermal cooling rates of the ceramic and metal, shear forces are set up between the surfaces of the two materials which tend to weaken the bond between them. Because of this poor bond, the piezoelectric ceramic crumbles and can be flaked off. By oxidizing the surface of the metal substrate in accordance with this invention, however, the oxide layer acts to absorb the shear stresses thereby improving the bond. Furthermore, the oxide layer causes the surface of the metal substrate to become much rougher which makes for a good molecular and mechanical bond between the two materials.

In actual samples, where an oxide layer had not been formed on the metal substrate and when the samples were stressed, the piezoelectric material flaked away from the metal substrate. However, in samples where a .05 to 1.0 mils oxide layer was formed on the metal substrate, the ceramic and the oxide layer remained intact while the oxide layer and the metal substrate parted, with the samples being broken.

As was previously stated, the gas ratio used was 55 cubic feet per hour of oxygen to 100 cubic feet per hour of hydrogen. It should be pointed out that the amount of oxygen in the ratio can be varied to control the oxidation. Another means which is also satisfactory in controlling the oxidation of the substrate is to control the time the flame is applied to the surface.

Post-heating the combined piezoelectric layer and metal substrate for five minutes increased the coefficient of coupling between the two materials from .065 to .089. In other tests it was found that by varying the post-heat time from ½ minute to 5 minutes the coupling coefficient varied proportionally between .065 and .089. The coefficient of coupling can be defined as the ratio between the mutual reactance and the square root of the product of self-reactances of the coupled circuits. One is considered to be maximum coupling and zero is minimum.

The results of this post-heating is extremely significant, especially in devices such as piezoelectric resonators which can be made by flame spraying a piezoelectric material on a metal substrate in the manner described. By controlling the post-heating, the coupling coefficient can be improved for better efficiency, and uniformity in the deposited material can be achieved from one device to the next. Therefore, insertion loss in each of the uniform resonators would be the same so that each would have a constant output frequency. Since in any type of commercial production of resonating devices, filters for instance, this high coupling coefficient and uniformity between the defices would be essential, post-heating of the deposited piezoelectric material and the substrate is an important advancement in flame spraying of piezoelectric materials on metal substrates.

What has been described, therefore, is an improved process for depositing piezoelectric material on a metal substrate which improves the coupling coefficient of the materials and also improves the bond therebetween.

What is claimed is:

1. The method of depositing a layer of piezoelectric material upon a metal substrate including the steps of, preheating the substrate to a temperature of between 1100° and 1300° F., oxidizing the same at a temperature of between 1100° and 1300° F. to form an oxide layer which is not less than .05 mil and not greater than 1.0 mil thick to make the surface rough, flame spraying a piezoelectric material onto the preheated and oxidized substrate while said substrate is at a temperature between 1100° F. and 1300° F., and post-heating the combined metal substrate and piezoelectric layer for from one-half to five minutes and at a temperature of between 1100° and 1300° F. to increase the coefficient of coupling therebetween, the oxide layer serving to absorb surface shear stresses produced by the difference in the thermal cooling rates between the two materials.

2. The method of depositing a layer of piezoelectric material upon a metal substrate including the steps of, preheating the substrate to a temperature between 1100° and 1300° F., oxidizing the same to form an oxide layer not less than .05 mils and not greater than 1.0 mils thick, said oxide layer making the surface of the substrate rough for a better molecular and mechanical bond and forming a layer for absorbing surface shear stresses produced by the difference in the thermal cooling rates between the two materials, flame spraying the piezoelectric material onto the preheated substrate, and post-heating the combined metal substrate and piezoelectric layer to a temperature between 1100° and 1300° F. for from one-half to five minutes.

3. The method defined in claim 2 wherein the piezoelectric material is flame sprayed while the substrate is at a temperature between 1100° and 1300° F.

References Cited

UNITED STATES PATENTS

| | | | |
|---|---|---|---|
| 2,759,854 | 8/1956 | Kilby | 117—217 |
| 2,904,449 | 9/1959 | Bradstreet | 117—105.2 |
| 3,141,753 | 7/1964 | Certa | 117—53 X |
| 3,338,001 | 6/1968 | Blum | 117—105.2 X |

ALFRED L. LEAVITT, Primary Examiner

C. K. WEIFFENBACH, Assistant Examiner

U.S. Cl. X.R.

117—46, 53, 105.2, 213, 221